(12) United States Patent
Lee

(10) Patent No.: US 7,874,414 B2
(45) Date of Patent: Jan. 25, 2011

(54) OVERRUNNING BI-DIRECTIONAL CLUTCH WITH CONTROLLED LOCKING

(75) Inventor: Brian Lee, York, SC (US)

(73) Assignee: Schaeffler KG, Herzogenaurach (DE)

( * ) Notice: Subject to any disclaimer, the term of this patent is extended or adjusted under 35 U.S.C. 154(b) by 566 days.

(21) Appl. No.: 11/923,886

(22) Filed: Oct. 25, 2007

(65) Prior Publication Data

US 2008/0099293 A1 May 1, 2008

Related U.S. Application Data

(60) Provisional application No. 60/854,528, filed on Oct. 26, 2006, provisional application No. 60/876,651, filed on Dec. 22, 2006.

(51) Int. Cl.
*F16D 41/064* (2006.01)
*F16D 41/08* (2006.01)
*F16D 15/00* (2006.01)

(52) U.S. Cl. .............................. 192/38; 192/44; 192/47
(58) Field of Classification Search ................ 192/38
See application file for complete search history.

(56) References Cited

U.S. PATENT DOCUMENTS

| 1,931,316 | A | * | 10/1933 | Fishburn | 192/71 |
| 4,093,049 | A | * | 6/1978 | Watson et al. | 192/47 |
| 6,092,635 | A | * | 7/2000 | McCarthy et al. | 192/45 |
| 6,409,001 | B1 | * | 6/2002 | Kerr | 192/44 |
| 6,557,680 | B2 | * | 5/2003 | Williams | 192/27 |
| 6,652,407 | B2 | * | 11/2003 | Ronk et al. | 475/204 |

* cited by examiner

*Primary Examiner*—Richard M. Lorence
(74) *Attorney, Agent, or Firm*—Lucas & Mercanti, LLP

(57) ABSTRACT

The overrunning bi-directional clutch with controlled locking provides an actuator pin with either a reduced profile or an enlarged profile that is moved in a controlled manner so as to provide an extended period of time between the freewheel mode and the lock mode for the clutch.

7 Claims, 10 Drawing Sheets

OVERRUNNING BI-DIRECTIONAL CLUTCH WITH CONTROLLED LOCKING

FIELD OF THE INVENTION

This invention relates to overrunning bi-directional clutches and, more particularly, to controlling the time period between freewheel mode and lock mode for the clutch.

BACKGROUND OF THE INVENTION

Overrunning bi-directional clutches are known, see for example U.S. Pat. Nos. 6,409,001; 7,004,875; and 7,037,200. Such clutches are mounted between two coaxial shafts and are used to transfer power between the two shafts. The clutch is fixed to a first shaft and selectively engages the second shaft so as to transfer power between the two shafts. Typically, the first shaft is the power input shaft and typically, the first shaft is also the inner shaft of the two shafts. The output shaft or second shaft can be a geared wheel.

Overrunning bi-directional clutches comprise a fixed ring, a slipper ring, cylindrical rollers which are housed between the two rings and may have an actuator. The fixed ring and the slipper ring are coaxial cylindrical rings with opposing faces. Each of the opposing faces has concave bearing surfaces which define pockets. Each pocket houses a roller.

The slipper ring has an axial groove or slit that extends both radially and axially through the ring. The slit allows the slipper ring to move radially under force and the memory inherent in the material from which the slipper ring is made allows the ring to return to a rest position once the force is withdrawn. The fixed ring is mounted onto the first shaft while the slipper ring is spaced in close proximity to the second shafts such that when the slipper ring moves radially, it engages the second shaft, thereby transferring power between the two shafts. Once the force is removed from the slipper ring, it returns to its rest position and no longer engages the second shaft.

The actuator is used to maintain the clutch in the freewheel mode and to move the clutch to the lock mode. Typically, the actuator is a radial mounted moveable pin which is fixed to the fixed ring and retractable from the slipper ring. When the actuator engages both rings the two rings are coupled and the clutch is in the freewheel mode. In the freewheel mode, the opposing concave bearing surfaces are aligned with each other and the rollers rest in the bottom of each of the opposing concave surfaces. When the actuator pin is withdrawn from the slipper ring, the two rings move relative to one another and the rollers move out of the bottom of the opposing concave surfaces and rise up along diagonally opposing surfaces of the pocket so as to force the slipper ring to move radially and to engage the second shaft, thereby transferring power between the two shafts, locking the clutch and placing the clutch in the lock mode.

One of the problems with overrunning bi-directional clutches is that once the actuator is moved to transfer the clutch from the freewheel mode to the lock mode, the clutch reacts very quickly and the overall time period is on the order of 10 to 25 milliseconds. For shafts traveling at high speeds, this shift can have a detrimental effect on the machine because the second shaft is essentially at rest and must be brought up to the speed of the first shaft instantaneously.

OBJECT OF THE INVENTION

It is the object of the invention to control the time period for moving the clutch from the freewheel mode to the lock mode to increase the time period to about 200 msec so as to provide a smooth and uniform transfer of power from the one shaft to the other shaft and thereby minimizing possible detriment during the shift of power.

These and other objects of the present invention will become more readily apparent by reference to the following description of the invention.

SUMMARY OF THE INVENTION

The objects of the invention are achieved by using an actuator assembly wherein the actuator pin has a profile for controlling the uncoupling of the slipper ring from the fixed ring. Suitably, the profile of the pin is a reduced profile which slowly uncouples the two rings. The frictional force from the oil shear between the slipper ring and the second shaft, forces the second shaft to slowly come up to the speed of the first shaft. During this slow engagement, the rollers slowly force the slipper ring into engagement with the second shaft.

The reduced profile of the actuator pin is reduced in an axial cross section when the pin moves in a linear, radial manner, or is a reduced profile in a radial cross section when the pin rotates in order to uncouple the rings.

Suitably, where the pin moves radially in a linear manner to uncouple the rings, a single pin can be used with a head having reduced triangular profile where the sides of the triangle are straight, concave or stepped. Alternatively, the reduced profile of the pin can be produced through a plurality of radially linear moving pins each having a consecutively, smaller cross section where the pins are consecutively withdrawn to stepwise decrease the clearance between the slipper ring and the second shaft.

Where the pin is rotated to uncouple the rings, the reduced profile is rectangular with curved or convex sides. The rectangular profile can be defined as having two bisecting lines which are perpendicular to each other wherein the one bisecting line has a shorter length than the other bisecting line.

In order to assist the frictional drag provided by the oil between the slipper ring and the second shaft where the second shaft is the outer shaft, an enlarged profile can be provided on the rotatable pin so as to force apart the slipper ring and to push the slipper ring into slow engagement with the outer shaft. In this situation, the profile for the control locking of the two rings can be referred to as a lobe.

Broadly, the present invention can be defined as an overrunning bi-directional clutch comprising:

a cylindrical slipper ring having a first radial surface for frictional engagement with a second shaft and a second radial surface having a bearing surface thereon;

a cylindrical fixed bearing surface, said slipper ring coaxial with and radially opposing said fixed bearing surface such that the bearing surface on said slipper ring radially opposes said fixed bearing surface; and an actuator assembly at said fixed bearing surface, said actuator assembly having an actuator pin, one end of said pin engaging said slipper ring to couple and uncouple said slipper ring from said fixed bearing surface, said one end of said pin having a profile for controlled locking of said clutch.

The fixed bearing surface can be an outer surface of the first shaft or an outer surface of a fixed cylindrical ring. In the case of a fixed cylindrical ring, the fixed cylindrical ring has a first radial surface affixable to the first shaft and a second radial surface which acts as the fixed bearing surface.

Rollers are used to effect radial movement of the slipper ring. The rollers are cylindrical rollers, balls or sprags. When cylindrical rollers or balls are used to effect radial movement of the slipper rings, the bearing surface of the slipper ring and the fixed bearing surface each have a plurality of concave bearing surface thereon. Each of the plurality of concave bearing surfaces of the slipper ring radially oppose a corresponding concave bearing surface on the fixed bearing surface so as to form a plurality of pockets and the cylindrical rollers or balls are housed in these pockets.

When sprags are used to effect radial movement of the slipper ring, a conventional cage for the sprags is used and the sprags in the cage are positioned between the bearing surfaces of the slipper ring and the fixed bearing surface. The bearing surfaces can be smooth to accommodate the movement of the sprags, however, pockets or a plurality of concave bearing surfaces can be used on one of the bearing surfaces.

These and other aspects of the present invention may be more readily understood by reference to one or more of the following drawings.

DETAILED DESCRIPTION OF THE DRAWINGS

Figure 1:
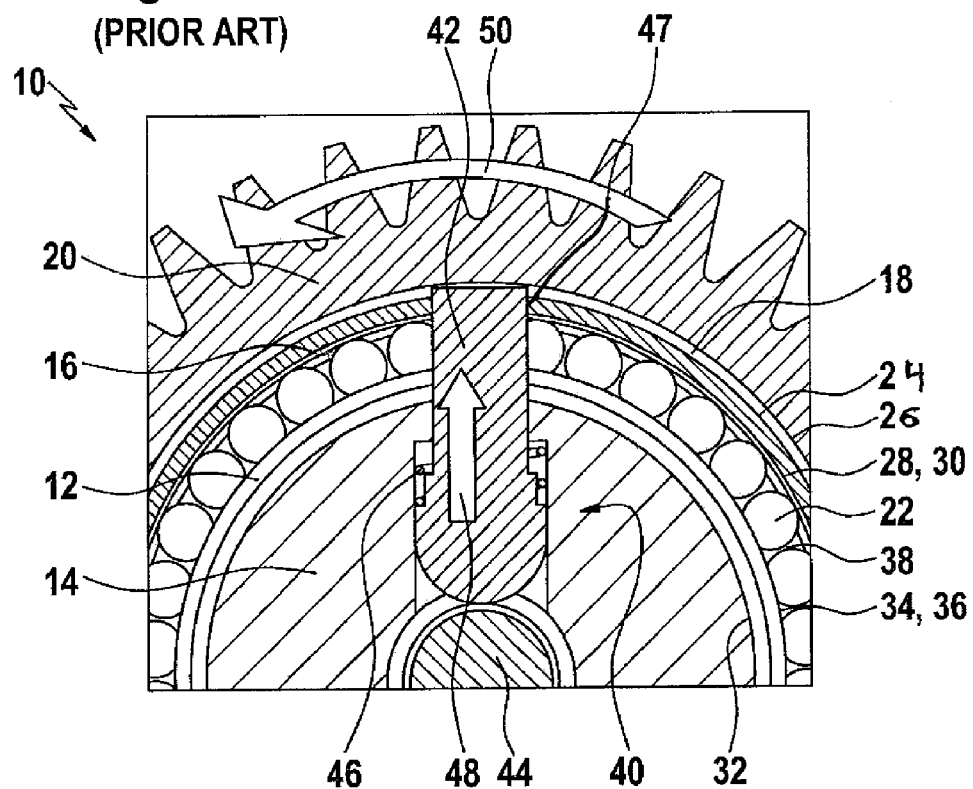
FIG. 1 illustrates a conventional overrunning bi-directional clutch in the freewheel mode.

FIG. 1 illustrates a conventional bi-directional slipper clutch 10 having fixed ring 12 which is fixed to inner shaft 14. Spaced radially away and coaxial to fixed ring 12 is slipper ring 16. Slipper ring 16 is spaced by clearance 18 from outer shaft 20. Between fixed ring 12 and slipper ring 16 are rollers 22. Frictional outer surface 24 of slipper ring 16 opposes frictional inner surface 26 of outer shaft 20. Inner surface 28 of slipper ring 16 has concave bearing surfaces 30. Fixed ring 12 has inner fixed surface 32 which is fixed to inner shaft 14. Fixed ring 12 has outer surface 34 with concave bearing surfaces 36 thereon. In the freewheel mode, as illustrated in FIG. 1 where slipper ring 16 and fixed ring 12 are coupled together, each concave bearing surface 30 radially opposes a concave bearing surface 36 and creates a pocket 38 there between. Each pocket 38 houses a roller 22.

The coupling and uncoupling of slipper ring 16 from fixed ring 12 is accomplished by actuator assembly 40. Actuator assembly 40 has actuator pin 42 and actuator cam 44. Actuator cam 44 moves in an axial direction in order to effect movement of actuator pin 42. Actuator spring 46 provides a downward force to actuator pin 42.

In the freewheel mode for the clutch, as illustrated in FIG. 1, actuator cam 44 applies an upward force shown by arrow 48 against actuator pin 42 to couple fixed ring 12 and slipper ring 16. The coupling of rings 12 and 16 means that rings 12 and 16 move together as inner shaft 14 rotates in the direction of arrow 50.

Figure 2:
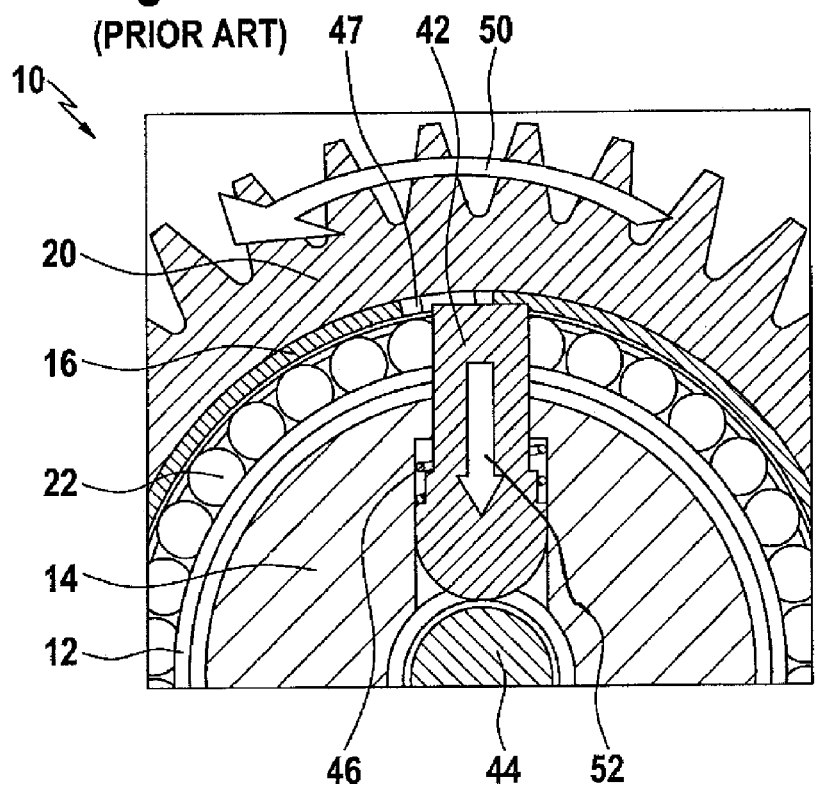
FIG. 2 illustrates the conventional clutch of FIG. 1 in the lock mode.

As illustrated in FIG. 2, when actuator cam 44 is moved axially to remove the upward force shown by arrow 48, actuator spring 46 applies a downward force shown by arrow 52 on actuator pin 42 which causes actuator pin 42 to leave actuator catch 47, thereby uncoupling slipper ring 16 from fixed ring 12. This uncoupling allows frictional surface 24 and 26 to engage and transfer power from inner shaft 12 to outer shaft 20. FIG. 2 illustrates the lock mode for the conventional clutch 10.

Figure 3:
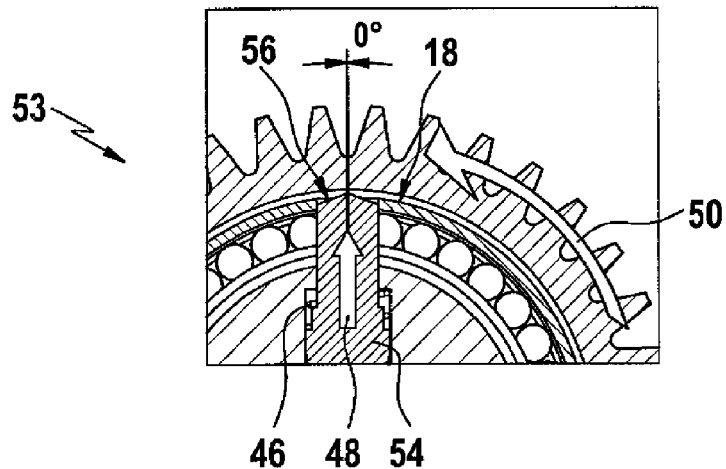
FIG. 3 illustrates a clutch of the present invention in the freewheel mode.

FIG. 3 illustrates clutch 53 of the present invention having an actuator pin 54 with reduced profile 56. As can be seen in FIG. 3, reduced profile 56 is triangular in shape and has straight side walls.

Figure 4:
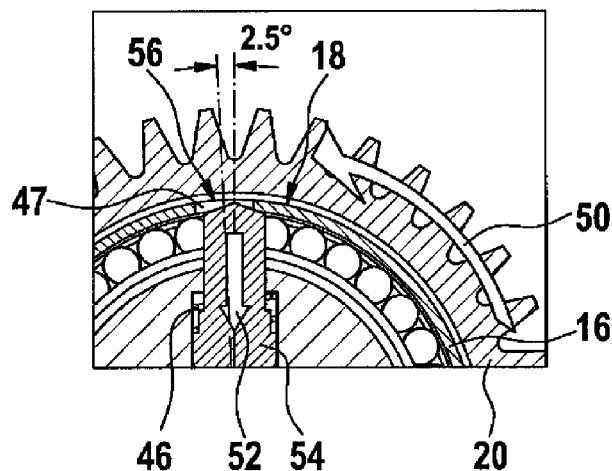
FIG. 4 illustrates the clutch of the present invention in the controlled lock mode.

As shown in FIG. 4, actuator pin 54 is lowered by actuator cam 44, not shown. Actuator cam 44 has a slanted cam surface which engages the bottom of actuator pin 54. Actuator spring 46 applies a force as illustrated by arrow 52 on actuator pin 54 to cause actuator pin 54 to drop as shown. This causes slipper ring 16 to rotate slightly as illustrated. Specifically, it is rotated at an angle of 2.5° due to the frictional drag provided by the oil shear between the frictional surfaces 24 and 26. This provides that slipper ring 16 has moved radially outward which decreases clearance 18 which has been labeled drag clearance in FIG. 4. This causes outer shaft 20 to accelerate and to start to come up to an equal speed of inner shaft 14. FIG. 4 illustrates the controlled lock mode of the present invention. As will be appreciated, as pin 54 moves downward, slipper ring 16 can continue to move outward due to the slanted surface of reduced profile 56. Thus, there is an infinite amount of control during the controlled lock mode.

Figure 5:
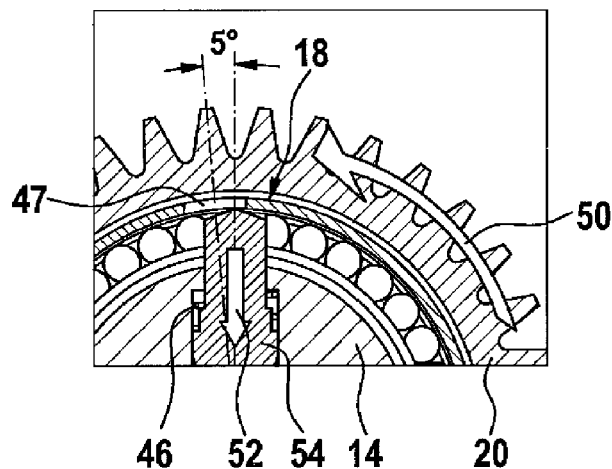
FIG. 5 illustrates the clutch of the present invention in the lock mode.

In FIG. 5, actuator pin 54 has moved downward by actuator cam 44 further removing and allowing actuator spring 46 to continue to move actuator pin 54 downward as shown by arrow 52. In FIG. 5, actuator pin 54 has left actuator catch 47 so that slipper ring 16 can fully engage outer shaft 20. This locks inner shaft 14 to outer shaft 20 and places the clutch into lock mode. As shown, there is no clearance 18 and outer shaft 20 rotates in unison with inner shaft 14.

Figure 6:
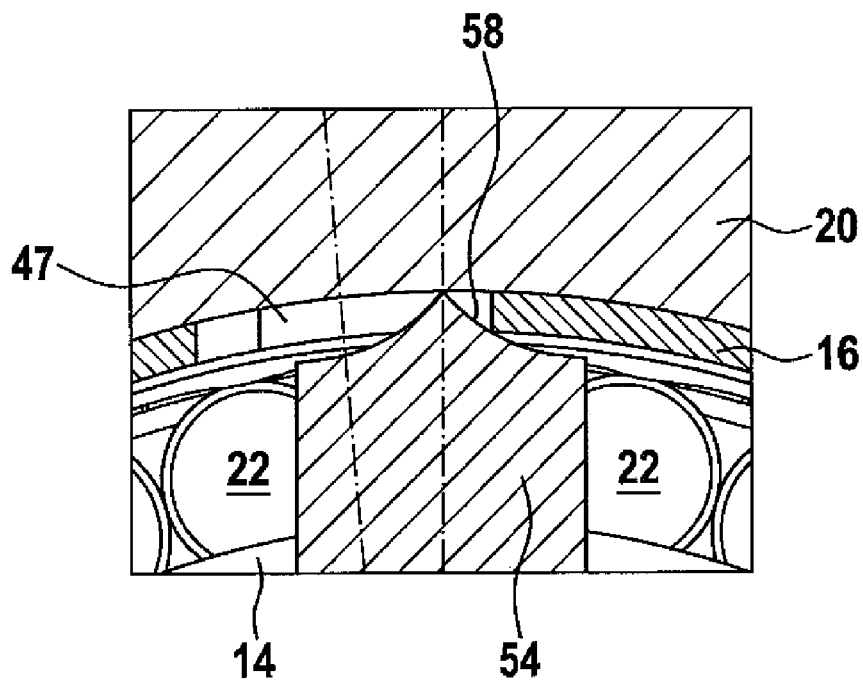
FIGS. 6 and 7 illustrate an actuator pin of the present invention with reduced profile.

FIG. 6 illustrates actuator pin 54 with reduced profile 58. Reduced profile 58 is a triangular profile with concave side walls.

Figure 7:
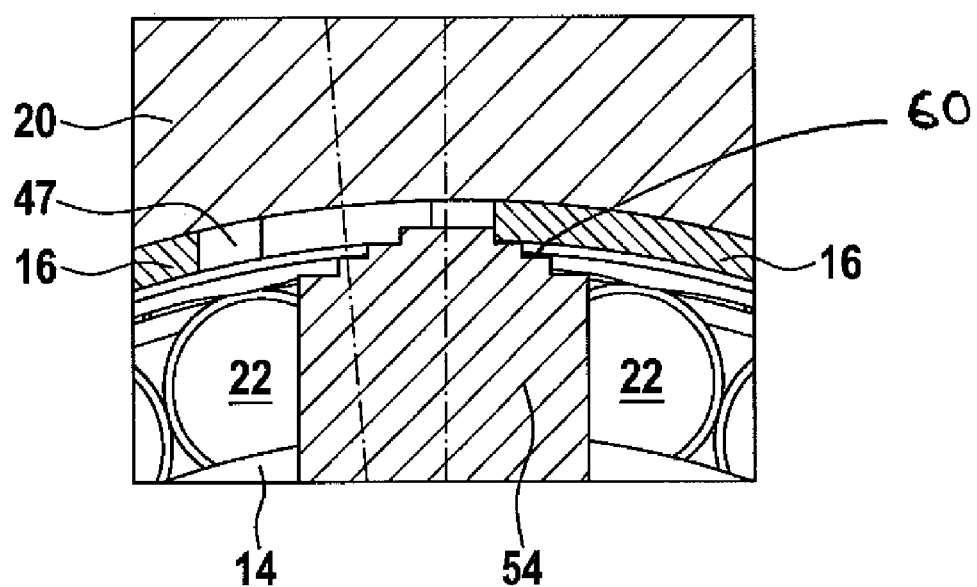

FIG. 7 illustrates actuator pin 54 having reduced profile 60 which is triangular in shape with stepped side walls. The stepped side walls allow for a finite number of positions during the controlled lock mode of the present invention.

Figure 8A:
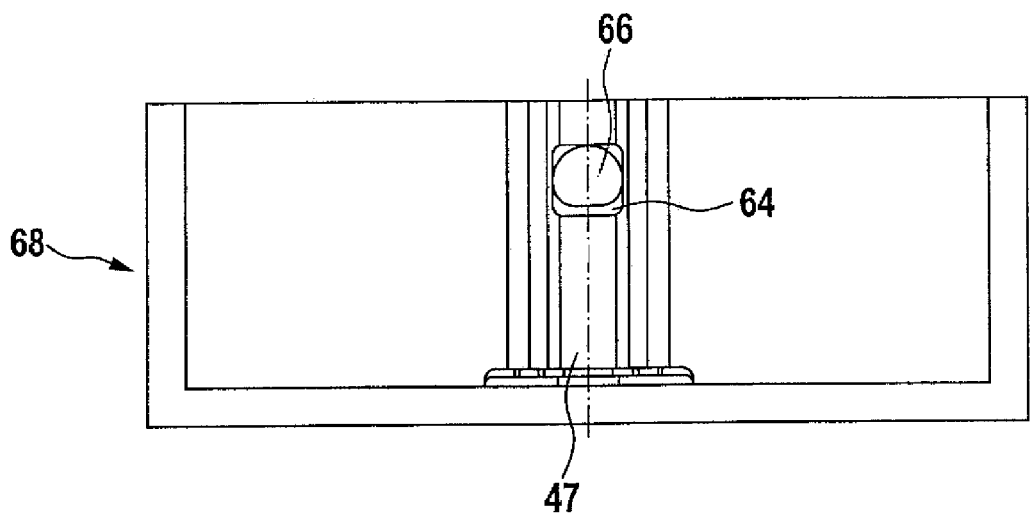
FIGS. 8A and 8B illustrate the clutch of the present invention using a rotating actuator pin where the clutch is in the freewheel mode.
Figure 8B:
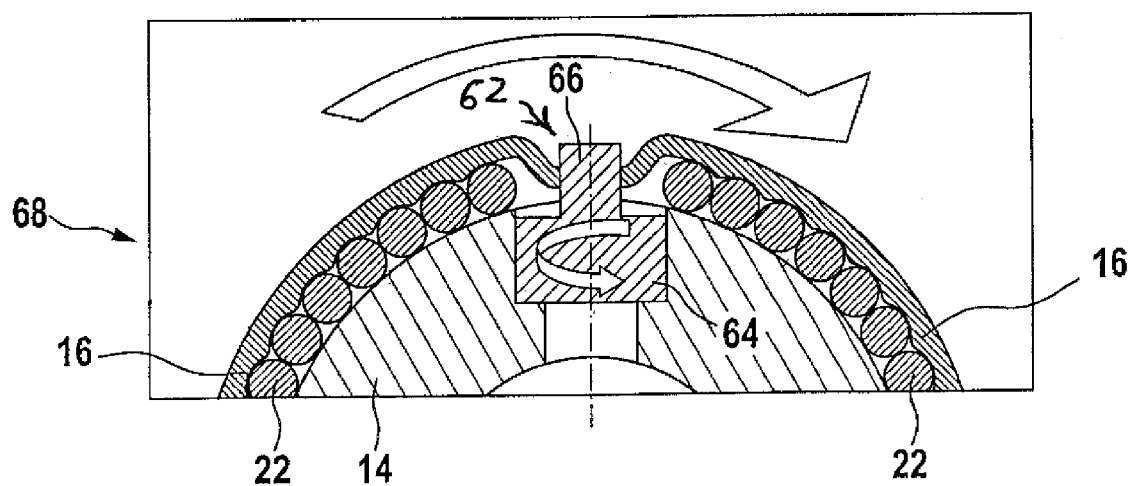

FIGS. 8A and 8B illustrate the present invention using a rotatable actuator pin 62 with a reduced profile. Rotatable actuator pin comprises base 64 and blade 66. FIG. 8A is a top view while FIG. 8B is a cross sectional view. As can be seen in FIG. 8A, blade 66 has a shorter dimension in one direction than the other and a curved side wall. The curved side walls in conjunction with the difference in the cross sectional dimensions allows for a reduced profile of the blade in one orientation than the other. FIGS. 8A and 8B illustrate clutch 68 in the freewheel mode wherein both the slipper ring 16 and fixed ring 12 move in unison.

Figure 9A:
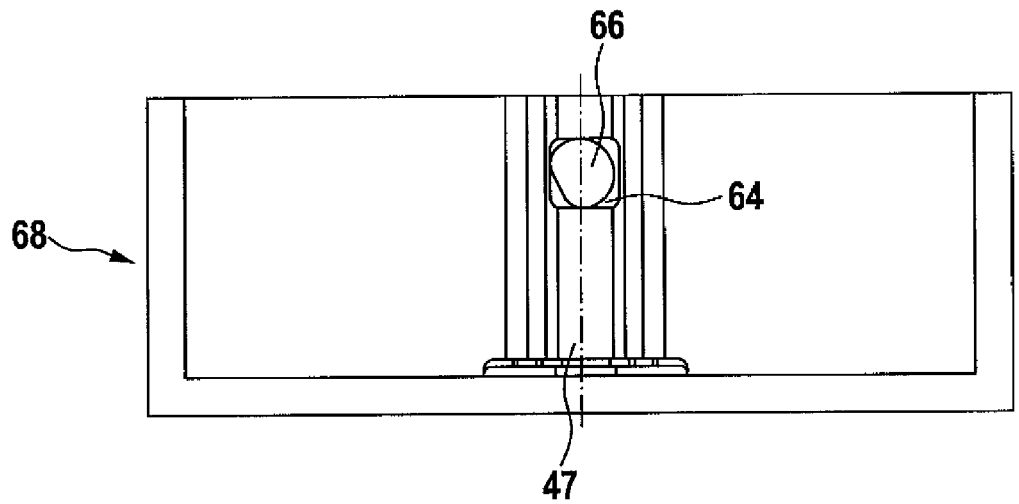
FIGS. 9A and 9B illustrate the clutch of the present invention using a rotating actuator pin in the controlled lock mode.
Figure 9B:
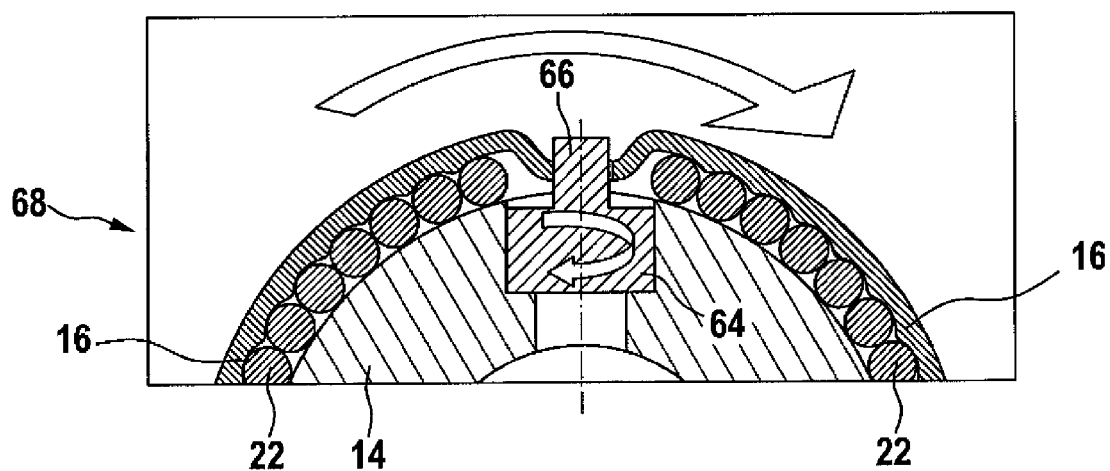

FIGS. 9A and 9B illustrate clutch 68 in the controlled locking mode. Base 64 has been rotated approximately 30° and blade 66 has, likewise, been rotated to decrease the dimensions of the blade in actuator catch 47. This causes slipper ring 16 to move and to decrease clearance 18 and provide increased frictional drag from the oil onto outer shaft 20. FIGS. 9A and 9B illustrate clutch 68 in the controlled lock mode.

Figure 10A:
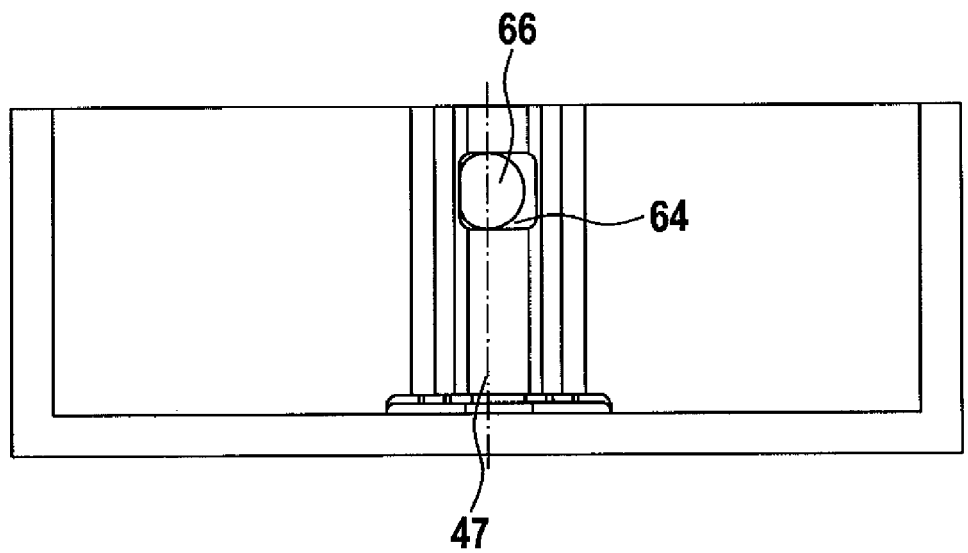
FIGS. 10A and 10B illustrate the clutch of the present invention using a rotating actuator pin in the lock mode.
Figure 10B:
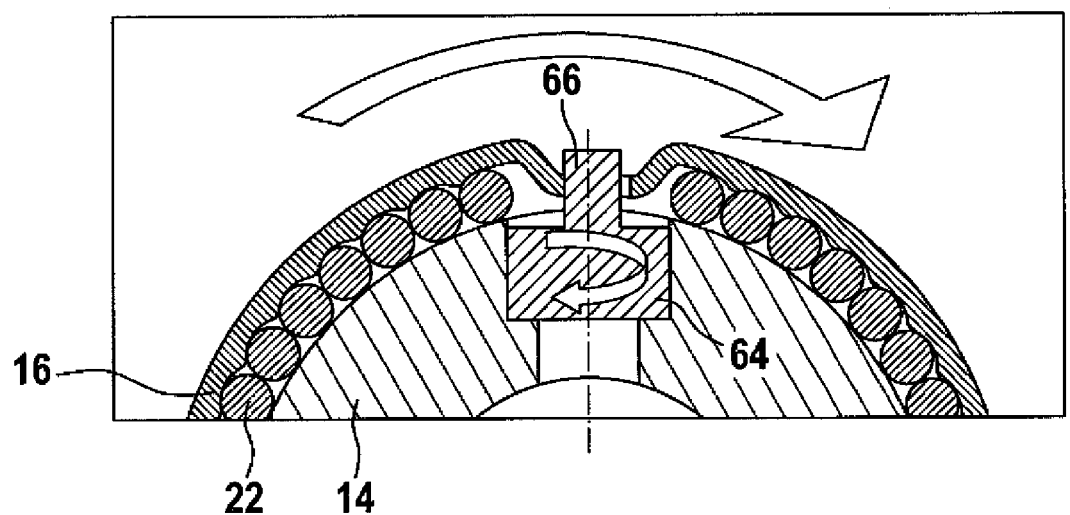

FIGS. 10A and 10B illustrate clutch 68 wherein actuator pin 64 has been rotated by 90° such that blade 66 provides its shortest dimension in actuator catch 47. This allows slipper ring 16 to fully expand and to lock inner shaft 14 to outer shaft 20. FIGS. 10A and 10B illustrates clutch 68 in the lock mode.

Figure 11A:
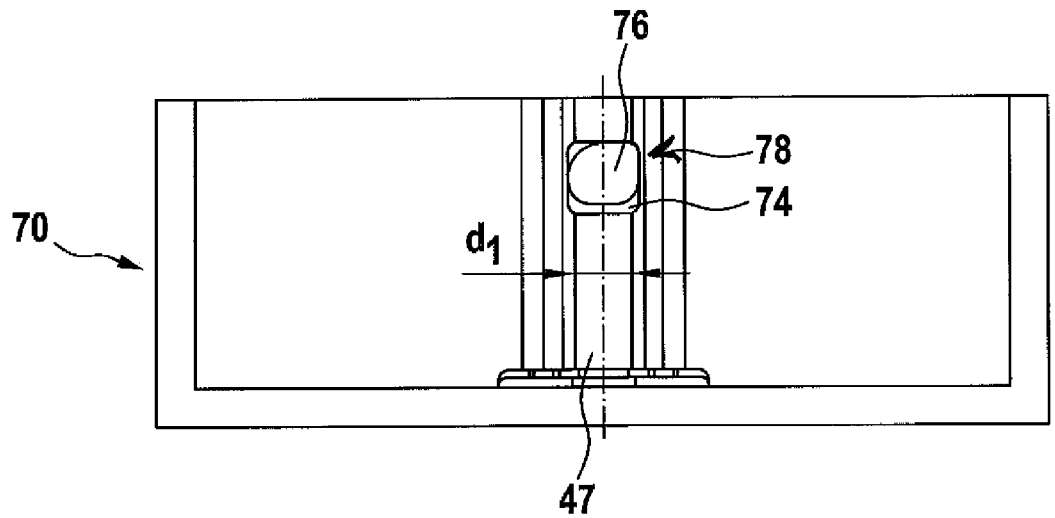
FIGS. 11A and 11B illustrate the clutch of the present invention using a rotating actuator pin having an enlarged profile in the freewheel mode.
Figure 11B:
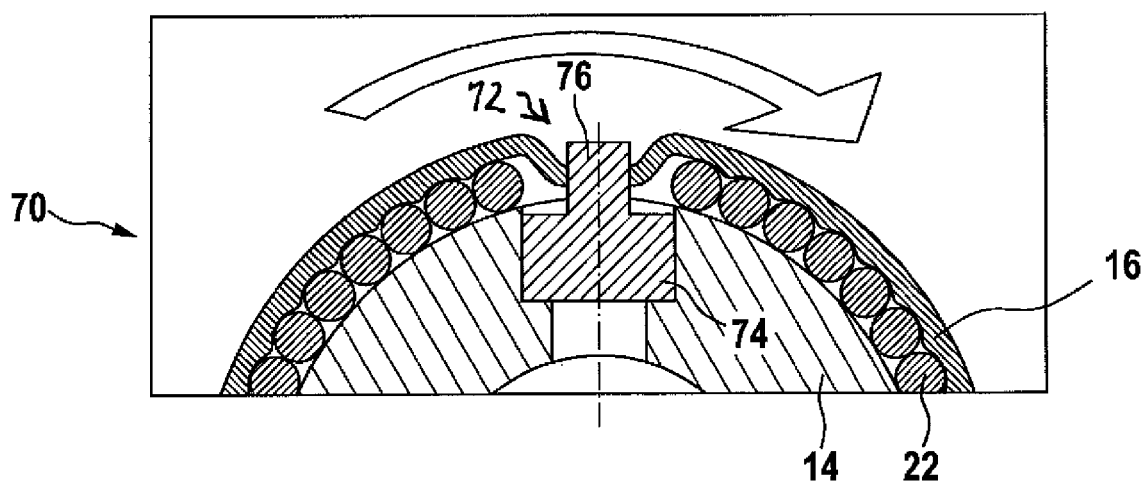

FIGS. 11A and 11B illustrate clutch 70 having rotating actuator pin 72 with base 74 and blade 76. Blade 76 has lobe 78 thereon. FIGS. 11A and 11B illustrate clutch 70 in the freewheel mode.

Figure 12A:
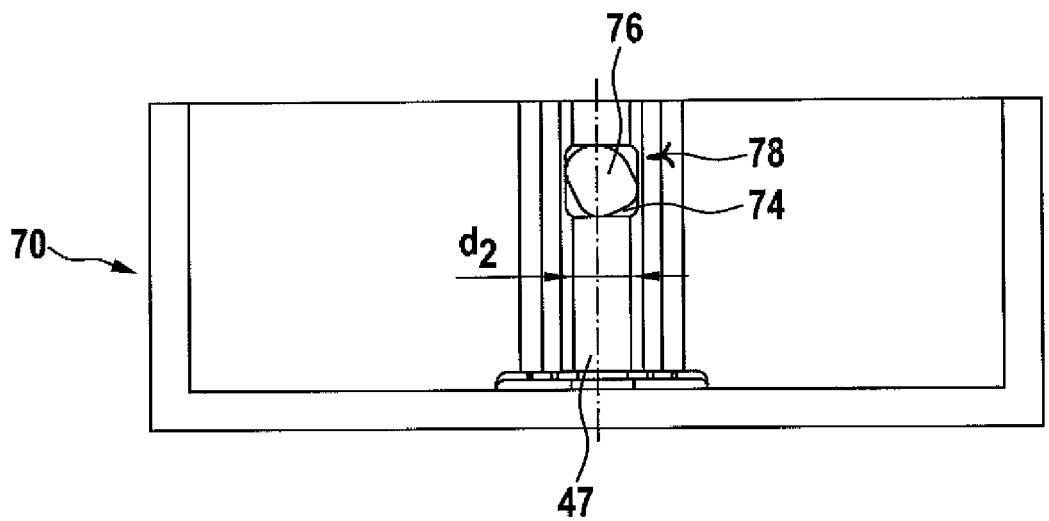
FIGS. 12A and 12B illustrate the clutch of the present invention using a rotating actuator pin of FIGS. 11A and 11B in the controlled lock mode.
Figure 12B:
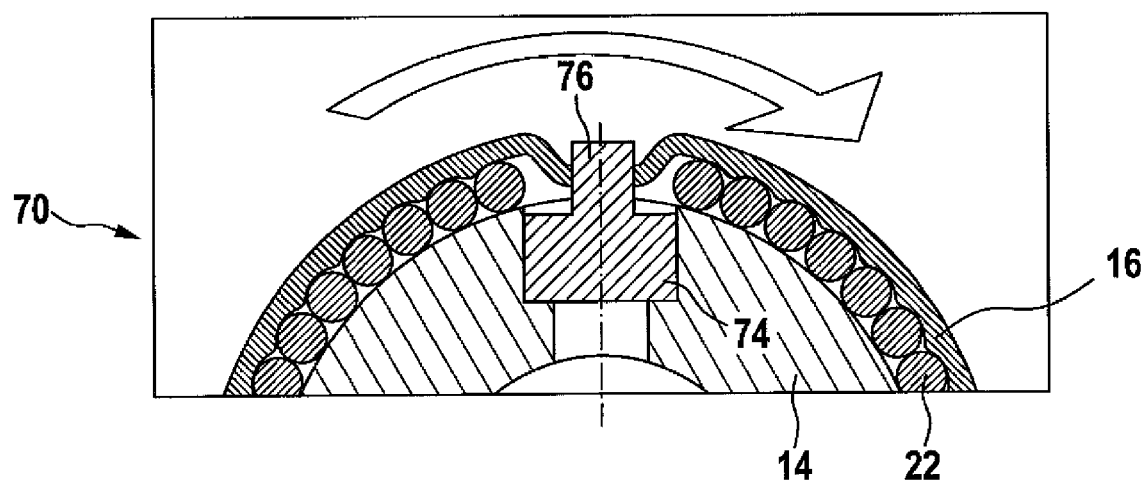

FIGS. 12A and 12B illustrate clutch 70 wherein blade 76 has been rotated by about 45° and has caused lobe 78 to push actuator catch 47 into a wider dimension than shown in FIGS. 11A and 11B. In other words, distance $d_1$ shown in FIG. 11A is less than distance $d_2$ shown in FIG. 12A. FIGS. 12A and 12B illustrate clutch 70 in the controlled lock mode.

Figure 13A:
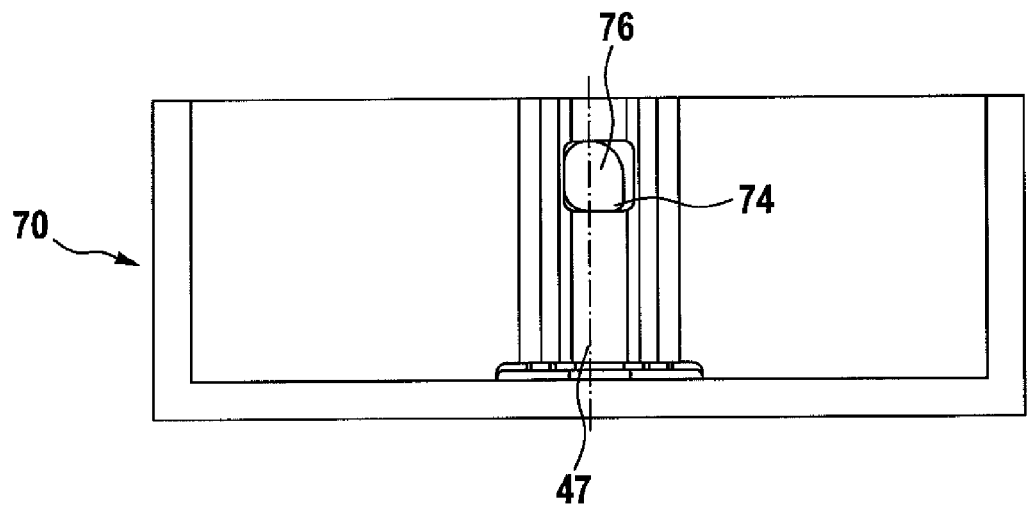
FIGS. 13 and 13A illustrate the actuator pin of FIGS. 11A and 11B in the lock mode.
Figure 13B:
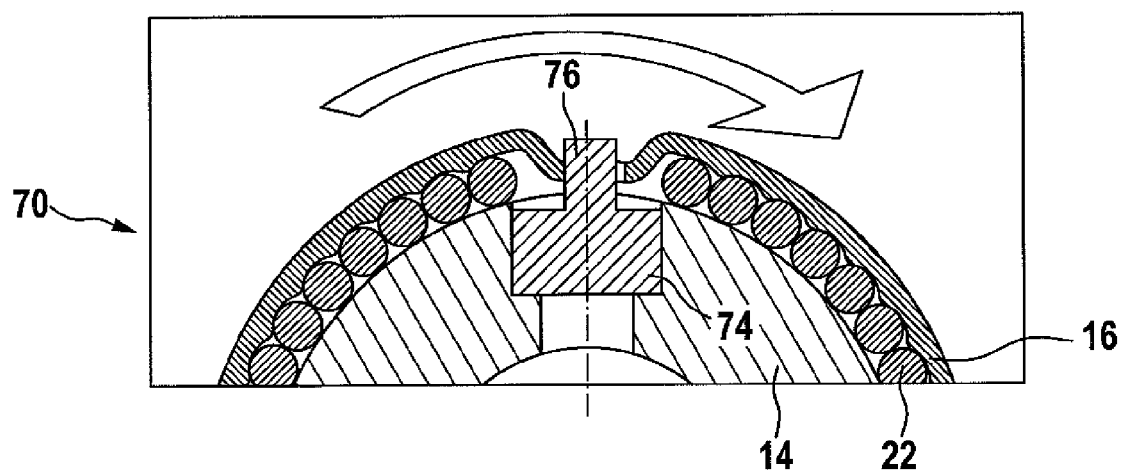

FIGS. 13A and 13B illustrate clutch 70 in the lock mode. Actuator pin 72 has been rotated such that blade 76 presents its smallest dimension in actuator catch 47 thereby allowing slipper ring 16 to fully expand and to cause inner shaft 14 and outer shaft 20 to lock. FIGS. 13A and 13B illustrate clutch 70 in the lock mode.

Figure 14A:
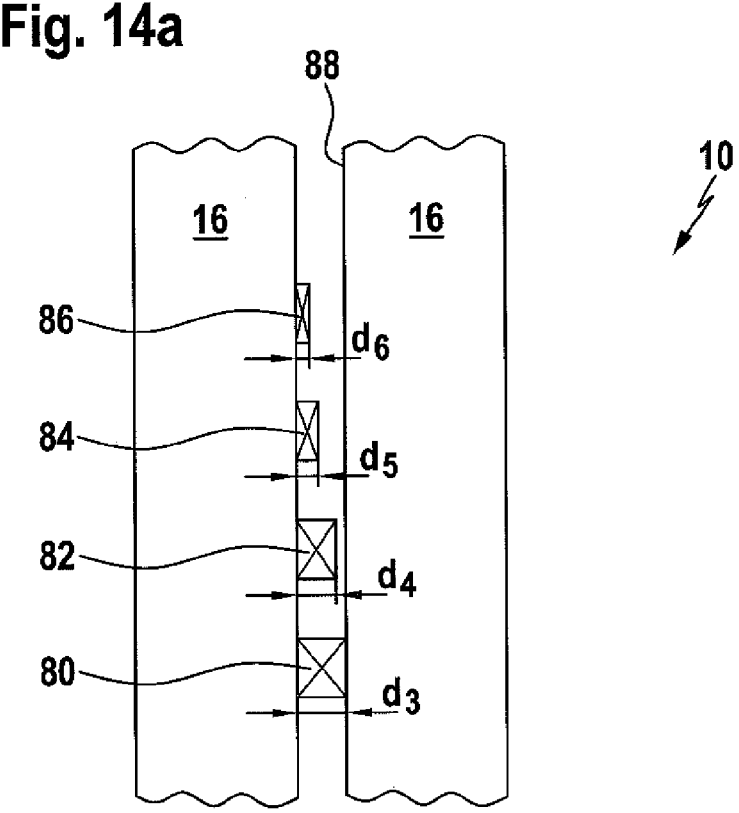
FIG. 14 illustrates a plurality of actuator pins with consecutively smaller cross section.
Figure 14B:
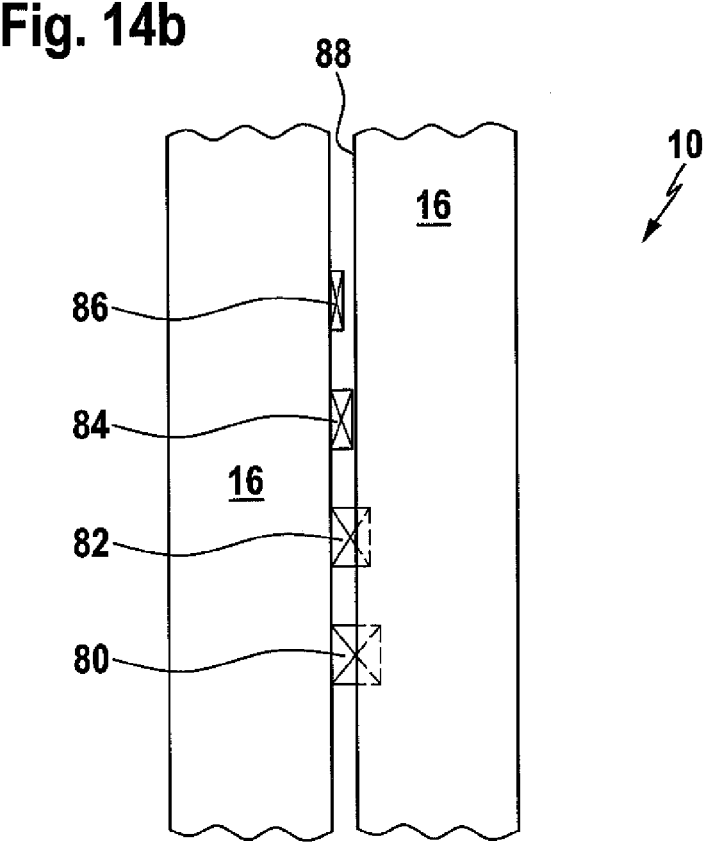

FIGS. 14A and 14B illustrate the present Invention where the reduced profile on the actuator pin is provided by a plurality of pins with consecutively reduced cross section. FIG. 14A illustrate each pin 80-86 extended into catch gap 88. FIG. 14B illustrates pins 80-82 withdrawn and pins 84 and 86 still extended.

Pins 80, 82, 84, 86 have consecutively decreasing cross section as shown. Pin 80 has clutch 10 in freewheel mode and pin 86 has clutch 10 in lock mode. By sequentially radially, withdrawing pins 80, 82, 84, 86 from catch gap 88 will sequentially decrease in width from $d_3$ to $d_6$. By sequentially withdrawing pins 80, 82, 84, and 86 a controlled lock mode is obtained.

REFERENCE CHARACTERS 10 clutch
12 fix ring
14 inner shaft
16 slipper ring
18 clearance
20 outer shaft
22 rollers
24 frictional outer surface
26 frictional inner surface
28 inner surface
30 concave bearing surface
32 inner fixed surface
34 outer surface
36 concave bearing surface
38 pockets
40 actuator assembly
42 actuator pin
44 actuator cam
46 actuator spring
47 actuator catch
48 up arrow
50 rotation arrow
52 down arrow
53 clutch
54 actuator pin
56 reduced profile
58 reduced profile

REFERENCE CHARACTERS 60 reduced profile
62 rotatable actuator pin
64 base
66 blade
68 clutch
70 clutch
72 actuator pin
74 base
76 blade
78 lobe
$d_1$ catch gap
$d_2$ catch gap
$d_3$ catch gap
$d_4$ catch gap
$d_5$ catch gap
$d_6$ catch gap
80 actuator pin
82 actuator pin
84 actuator pin
86 actuator pin
88 catch gap

I claim:

1. An overrunning bi-directional clutch for transferring power between a first and second coaxial shaft, comprising:
   a cylindrical slipper ring having a first radial surface for frictional engagement with the second shaft and a second radial surface having a bearing surface thereon;
   a cylindrical fixed bearing surface affixable to said first shaft, said slipper ring being coaxial with said fixed bearing surface such that said bearing surface on said slipper ring radially opposes said fixed bearing surface; and
   an actuator assembly having a rotatable actuator pin which has a proximate end and a distal end, said proximate end being seated in a recess in said first shaft and said distal end being engageable with said slipper ring to couple and uncouple said slipper ring and said fixed bearing surface upon rotation of said pin, and said distal end having a profile for controlled locking of said clutch.

2. The clutch of claim 1, wherein said profile is non-uniform.

3. The clutch of claim 1, wherein the profile of said distal end is a predominately rectangular profile with at least one curved side.

4. The clutch of claim 1, wherein the profile of the said distal end is a lobe.

5. An overrunning bi-directional clutch for transferring power between a first and second coaxial shaft, comprising:
   a cylindrical slipper ring having a first radial surface for frictional engagement with the second shaft and a second radial surface having a plurality of concave bearing surfaces thereon;
   a cylindrical fixed ring having a first radial surface for affixing to a first shaft and a second radial surface having a plurality of concave bearing surfaces thereon, said slipper ring being coaxial with and radially opposing said fixed ring such that each of said concave bearing surfaces on said slipper ring radially opposes one of said concave bearing surfaces on said fixed ring so that a plurality of pockets are formed between said slipper ring and said fixed ring;

a plurality of rollers, one of each roller positioned in one of each pockets; and an actuator assembly having a rotatable actuator pin which has a proximate end and a distal end, said proximate end being seated in a recess in said first shaft and said distal end being engageable with said slipper ring to couple and uncouple said slipper ring and said fixed ring upon rotation of said pin, and said distal end having a profile for controlled locking of said clutch.

6. The clutch of claim 5, wherein said profile of said distal end is non-uniform.

7. The clutch of claim 5, wherein the profile of the distal end is a lobe.

\* \* \* \* \*